(12) United States Patent
Zhou et al.

(10) Patent No.: US 10,585,437 B1
(45) Date of Patent: Mar. 10, 2020

(54) AUTO-RECHARGING OF ROBOT

(71) Applicant: NEXTVPU (SHANGHAI) CO., LTD., Shanghai (CN)

(72) Inventors: Ji Zhou, Shanghai (CN); Xinpeng Feng, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/396,613

(22) Filed: Apr. 26, 2019

Related U.S. Application Data

(63) Continuation of application No. PCT/CN2019/082317, filed on Apr. 11, 2019.

(30) Foreign Application Priority Data

Sep. 25, 2018 (CN) .......................... 2018 1 1118208

(51) Int. Cl.
*G05D 1/02* (2020.01)
*B25J 9/00* (2006.01)
(Continued)

(52) U.S. Cl.
CPC ........ *G05D 1/0225* (2013.01); *A47L 11/4011* (2013.01); *B25J 9/0003* (2013.01);
(Continued)

(58) Field of Classification Search
CPC ... G05D 1/0225; G05D 1/0246; B25J 9/1664; B25J 9/1697; B25J 9/0003; B25J 9/1661;
(Continued)

(56) References Cited

U.S. PATENT DOCUMENTS

| 8,515,580 | B2* | 8/2013 | Taylor | .............. B25J 19/005 |
| | | | | 700/259 |
| 10,243,379 | B1* | 3/2019 | Kwa | .............. B60L 53/16 |

(Continued)

FOREIGN PATENT DOCUMENTS

| CN | 1853552 A | 11/2006 |
| CN | 1899773 A | 1/2007 |

(Continued)

OTHER PUBLICATIONS

English Abstracts for Non-English Documents—JP2007035031A and JP2016524214A, 1 page.

*Primary Examiner* — Jason Holloway
(74) *Attorney, Agent, or Firm* — Womble Bond Dickinson (US) LLP

(57) ABSTRACT

The present disclosure provides a robot, an auto-recharging method therefor and a storage medium. The auto-recharging method for a robot comprises: the robot moving from an initial position to a docking position, wherein the docking position faces a charging interface of a charging pile; the robot traveling from the docking position to a charging position along a first path such that the robot is docked to the charging pile at the charging position, wherein the first path is a straight-line or approximately straight-line path, and the robot maintains a docking pose during the course of traveling along the first path and the charging pile is identified in the images captured by the robot in real time. The present disclosure may achieve auto-recharging of the robot without guidance of active light source, thereby reducing the cost of the robot and meanwhile offering a high flexibility to the equipment.

13 Claims, 9 Drawing Sheets

(51) Int. Cl.
*B25J 9/16* (2006.01)
*A47L 11/40* (2006.01)
*A47L 9/28* (2006.01)

(52) U.S. Cl.
CPC ............ *B25J 9/1661* (2013.01); *B25J 9/1664* (2013.01); *B25J 9/1697* (2013.01); *G05D 1/0246* (2013.01); *A47L 9/2873* (2013.01); *A47L 2201/00* (2013.01); *A47L 2201/022* (2013.01); *A47L 2201/04* (2013.01)

(58) Field of Classification Search
CPC ............. A47L 2201/022; A47L 9/2873; A47L 2201/02; A47L 2201/00; A47L 11/4011
See application file for complete search history.

(56) References Cited

U.S. PATENT DOCUMENTS

| | | | | |
|---|---|---|---|---|
| 2002/0153185 | A1* | 10/2002 | Song | A47L 9/009 180/167 |
| 2004/0158357 | A1* | 8/2004 | Lee | B60L 15/2036 700/258 |
| 2011/0137461 | A1* | 6/2011 | Kong | G05D 1/0225 700/253 |
| 2011/0238214 | A1* | 9/2011 | Yoo | G05D 1/0225 700/258 |
| 2014/0100693 | A1 | 4/2014 | Fong et al. | |
| 2016/0143500 | A1* | 5/2016 | Fong | G05D 1/0274 15/319 |
| 2016/0378117 | A1* | 12/2016 | Szatmary | B25J 5/00 382/153 |
| 2017/0105592 | A1* | 4/2017 | Fong | G05D 1/0274 |
| 2018/0246518 | A1 | 8/2018 | Vogel et al. | |
| 2019/0155295 | A1* | 5/2019 | Moore | G05D 1/0225 |

FOREIGN PATENT DOCUMENTS

| | | |
|---|---|---|
| CN | 102662400 A | 9/2012 |
| CN | 106097341 A | 11/2016 |
| CN | 106125724 A | 11/2016 |
| CN | 106647747 A | 5/2017 |
| CN | 107291084 A | 10/2017 |
| CN | 107637255 A | 1/2018 |
| CN | 107945233 A | 4/2018 |
| EP | 2457486 A2 | 5/2012 |
| JP | 2006-236333 A | 9/2006 |
| JP | 2007035031 A | 2/2007 |
| JP | 2015-535373 A | 12/2015 |
| JP | 2016524214 A | 8/2016 |
| KR | 10-2013-0043305 A | 4/2013 |
| WO | 2016209029 A1 | 12/2016 |

* cited by examiner

AUTO-RECHARGING OF ROBOT

CROSS-REFERENCE TO RELATED APPLICATIONS

This application is a continuation of International Application No. PCT/CN2019/082317, filed on Apr. 11, 2019, which claims priority to Chinese Patent Application No. 201811118208.8, filed on Sep. 25, 2018. The disclosures of the aforementioned applications are herein incorporated by reference in their entireties.

FIELD

The present disclosure relates to the field of robots, and more particularly to a robot, an auto-recharging method for a robot and a storage medium.

BACKGROUND

Currently, mobile robots (e.g., sweeping robots) have been accepted and actually used by more and more families. A sweeping robot may automatically return to a charging pile for charging when the power is not sufficient to continue cleaning. Conventional auto-recharging approaches of sweeping robots include: 1) a charging base emits an infrared signal; after entering into the coverage of the infrared signal in the process of movement, the robot receives the infrared signal via an infrared receiver at the front end of the robot and repeatedly adjusts the direction of motion until it contacts with a metal electrode sheet on the charging base; 2) a navigation technology is adopted; the charging base projects two beacon's faculae to the ceiling; a four-quadrant infrared receiving window is arranged at an upper end of the robot; the current coordinates and pose of the robot may be computed by converting the projected area of the faculae on a sensor into an electrical signal.

SUMMARY

The disclosure provides a robot, an auto-recharging method therefor and a storage medium, and auto-recharging of the robot can be achieved without guidance of active light source, thereby reducing the cost of the robot.

According to an aspect of the present disclosure, there is provided a computer-implemented method.

The method comprises: moving a robot from an initial position to a docking position, wherein the docking position faces a charging interface of a charging pile, and the docking position is determined based on a position of the charging pile identified by means of images captured by the robot in real time; and moving the robot from the docking position to a charging position along a first path such that the robot is docked to the charging pile at the charging position. The first path is a straight-line or approximately straight-line path. During the course of traveling along the first path, the robot maintains a docking pose and the charging pile is identifiable in the images captured by the robot in real time.

According to another aspect of the present disclosure, there is also provided a robot.

The robot comprises a sensor at least configured to capture images surrounding the robot in real time; a motor configured to drive the robot; and a processor configured to: cause the robot to move from an initial position to a docking position, wherein the docking position faces a charging interface of the charging pile, and the docking position is determined based on a position of the charging pile identified by images captured by the robot in real time; and cause the robot to travel along a first path from the docking position to a charging position so as to be docked with the charging pile at the charging position, wherein the first path is a straight-line or approximately straight-line path. During the course of traveling along the first path, the robot maintains a docking pose and the charging pile is identifiable in the images captured by the robot in real time.

According to yet another aspect of the present disclosure, there is also provided a storage medium on which a computer program is stored, wherein when being executed by the processor, the computer program performs above mentioned steps.

BRIEF DESCRIPTION OF THE DRAWINGS

The above and other features and advantages of the present disclosure will become more apparent through the detailed depictions of the exemplary embodiments with reference to the accompanying drawings.

DETAILED DESCRIPTION OF EMBODIMENTS

Figure 1:
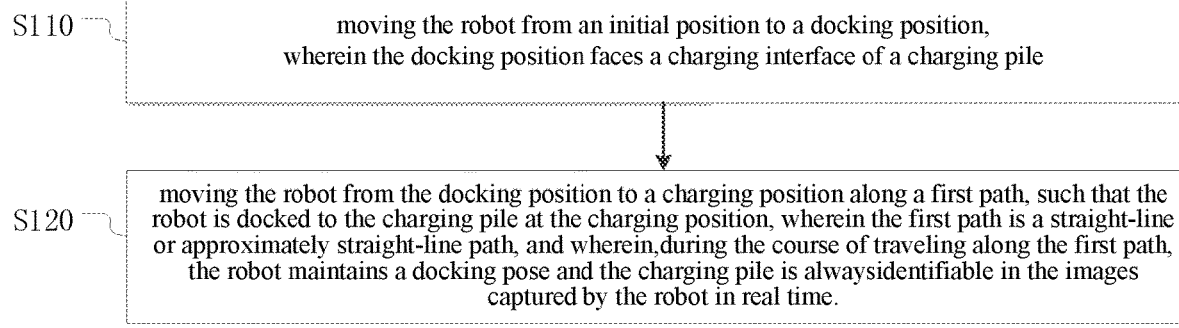
FIG. 1 shows a flowchart of an auto-recharging method for a robot according to an embodiment of the present disclosure.

Now, exemplary embodiments will be described more comprehensively with reference to the accompanying drawings. However, the exemplary embodiments may be implemented in a plurality of forms, and should not be construed as being limited to the examples illustrated herein; on the contrary, provision of these embodiments makes the present disclosure more comprehensive and complete, and the ideas of the exemplary embodiments can be comprehensively conveyed to those skilled in the art. The described features, structures or properties may be combined in one or more embodiments in any appropriate manner.

Besides, the accompanying drawings are only schematic illustrations of the present disclosure, not necessarily drawn proportionally. The same reference numbers in the drawings represent same or similar portions, and thereby repeated depictions thereof will be omitted. Some blocks illustrated in the drawings are functional entities, which do not necessarily correspond to physically or logically independent entities. These functional entities may be implemented by software, or implemented in one or more hardware modules or integrated circuits, or implemented in various networks and/or processor devices and/or microcontroller devices.

In both of the above-mentioned auto-recharging methods, extra equipment need to be added to the robot and the charging base: an infrared emitter and a sensing device for receiving infrared signals are needed to be additionally provided to the charging base and the robot, respectively, or a device for projecting beacon's faculae needs to be additionally provided to the charging base so as to project beacon's faculae; consequently, the cost of the equipment will increase. Meanwhile, for an auto-recharging solution using infrared technology, the emitter of the charging base needs to be open; besides, the infrared emitter per se has a relatively high energy consumption, which incurs a high cost of the robot. For technical solutions of the guidance of active light source, such as an auto-recharging solution using infrared technology and an auto-recharging solution using guidance of an active light etc., a long wavelength light beam is adopted; however, the long wavelength light beam has poor penetration of obstacle. When an obstacle exists between the charging pile and the sweeping robot, the active light source cannot penetrate through the obstacle and thus cannot be received by a light beam sensing device on the robot; thereby automatic return to the pile is impeded, environment adaptability is poor, the equipment is easy to damage and thus has a short service life. Besides, if auto recharging for the robot is guided by active light, a matching light emitting device and a matching light sensing and receiving device are needed; if one of them is damaged, the matching light emitting device and the matching light sensing and receiving device is required to replace, which brings about a great limitation and a poor flexibility.

To overcome the drawbacks of the relevant technology, the present disclosure provides a robot, an auto-recharging method for a robot, an auto-recharging system for a robot, an electronic equipment, and a storage medium, which can achieve auto-recharging of the robot without guidance of active light source, thereby reducing the cost of the robot and meanwhile offering a high flexibility to the equipment.

First, referring to FIG. 1, which shows a flowchart of an auto-recharging method for a robot according to an embodiment of the present disclosure.

FIG. 1 shows two steps:

Step S110: the robot moving from an initial position to a docking position, wherein the docking position faces a charging interface of a charging pile;

Step S120: the robot traveling from the docking position to a charging position along a first path such that the robot is docked to the charging pile at the charging position, wherein the first path is a straight-line or approximately straight-line path, and the robot maintains a docking pose during the course of traveling along the first path, and the charging pile is identified in the images captured by the robot in real time.

Compared with relevant technology, the auto-recharging method for a robot provided by the present disclosure has the following advantages:

1) The auto-recharging for a robot can be achieved by virtue of the images captured by the robot in real time, which omits guide devices such as an active light source emitter and an active light source receiver, thereby reducing the manufacturing cost, and solving the problems such as high energy consumption of the emitting device and high usage cost of the robot;

2) The auto-recharging for a robot can be achieved by virtue of the images captured by the robot in real time, which put forward low requirements on the equipment of the charging pile and the robot, because a universal charging pile may enable the robot to go back to the pile for charging, thereby offering a high flexibility to the equipment;

3) Different traveling ways of the robot or different path planning/adjusting ways of the robot can be used in different path segments by segmented path planning of the path of returning to the pile, which help solve the problem of the robot going back to the pile in a highly efficient manner.

Figure 2:
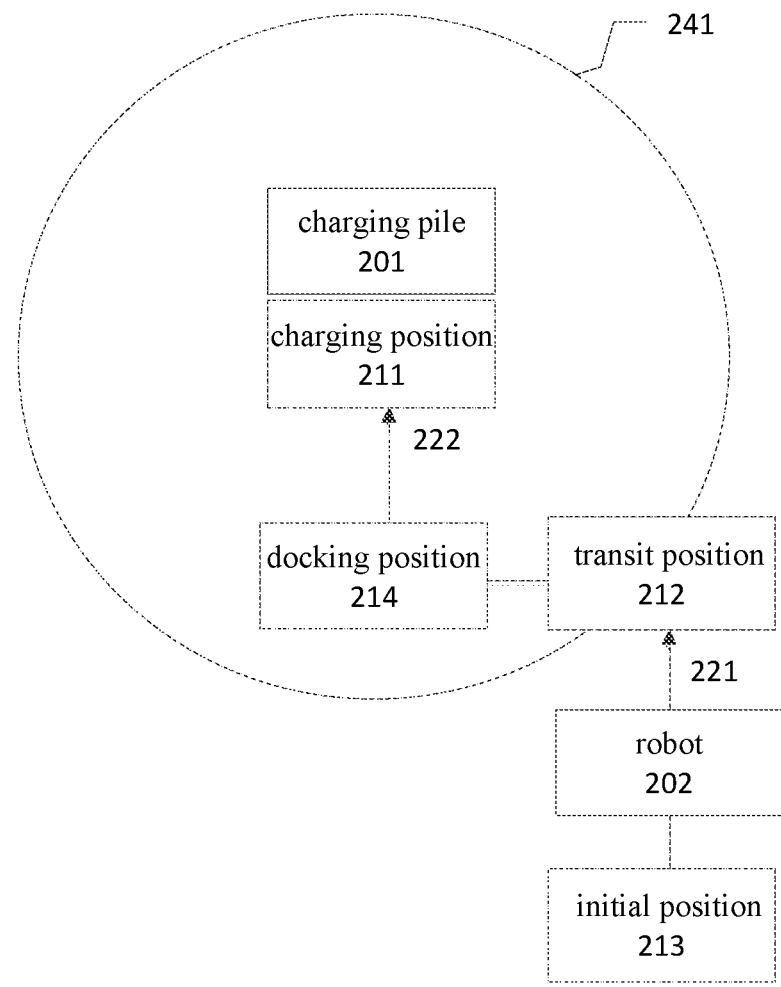
FIG. 2 shows a schematic diagram of auto-recharging for a robot according to an auto-recharging system for a robot of an embodiment of the present disclosure.

Hereinafter, the auto-recharging method for a robot provided by the present disclosure will be further described with reference to FIG. 2. FIG. 2 shows a schematic diagram of auto-recharging for a robot according to an auto-recharging system for a robot of an embodiment of the present disclosure.

As shown in FIG. 2, the robot 202 detects a low battery at an initial position 213 and needs to go to a charging position 211 so as to be docked with a charging pile 201 for charging.

To move to the charging position 211, the robot 202 first determines a position of its initial position 213 in an environment map. The environment map may be trained and built when the robot 202 is in use. In some embodiments, the initial position 213 of the robot 202 is determined based on a motion trajectory of the robot 202 in the environment map before recharging. In other words, in this embodiment, the robot 202 may obtain its motion trajectory and then determine the position of its initial position 213 in an environment map based on the motion trajectory. In another embodiment, the robot 202 may directly capture the charging pile 201 before recharging, so as to determine the position of the initial position 213 in the environment map by capturing the charging pile 201 in the images. In some other embodiments, the robot 202 may just be turned on or moved by a person before recharging, such that the robot 202 cannot get its actual motion trajectory and thus cannot determine the position of its initial position 213 in the environment map based on the actual motion trajectory. In such an embodiment, the initial position 213 of the robot 202 is determined based on images captured by the robot in real time. For example, a plurality of identification features may be set in the environment map where the robot 202 is located (e.g., in the form of outlines of objects such as a chair, a desk, a sofa, or two-dimensional codes such that the coordinates of the identification features may be read); when an identification feature appears in the images captured by the robot 202 in real time, the position of the initial position 213 of the robot 202 in the environment map may be determined based on the coordinates (position in the environment map) of the identification feature. In some other embodiments, an identification feature may also be provided on the charging pile. If the robot 202 identifies the charging pile in the images captured at the initial position 213, the position of the initial position 213 in the environment map may be determined by the identification feature on the charging pile. What has been mentioned above only schematically depicts embodiments of the present disclosure, and the present disclosure is not limited thereto.

After the robot 202 determines the position of its initial position 213 in the environment map, the robot 202 needs to determine a boundary of a transit area 241 preset in the environment map to which the robot 202 moves. When presetting the transit area 241 in the environment map, the transit area 241 may be preset based on an area where the charging pile 201 may be identified in the images captured when building the environment map.

In some embodiments, an arbitrary position at the boundary of the transit area 241 may be selected. In some other embodiments, the boundary position of the selected transit area 241 is located in a shortest path for avoiding an obstacle from the initial position 213 to the boundary of the transit area 241; if there is no obstacle, the shortest path is a shortest straight-line path from the initial position 213 to the boundary of the transit area 241. In some other exemplary embodiments, the boundary position of the selected transit area 241 is located on a connecting line between the initial position 213 and the charging position 211, such that the transit position 212 may be uniquely determined and the shortest path planning between the positions may be implemented. The present disclosure may implement more variations, which will not be detailed here.

After the robot 202 determines the initial position 213 and the boundary of the transit area 241 preset in the environment map to which the robot 202 moves, the robot 202 plans a second path 221 from the initial position 213 to the boundary of the transit area 241. The second path 221 is preferably a shortest path that may avoid an obstacle, and preferably a straight-line path. Then, the robot 202 travels along the second path 221 from the initial position 213 to the boundary of the transit area 241.

In some embodiments, when the robot 202 may capture the image of the charging pile at the initial position 213, i.e., when the initial position 213 is located in the transit area 241, the robot 202 may not plan the second path 221.

When the robot 202 moves to the boundary of the transit area 241, it is determined whether the charging pile 201 is identified in the images captured by the robot 202 in real time. In some embodiments, the image of the charging pile 201 may be prestored in the robot 202, such that an image feature of the charging pile may be determined based on the image of the charging pile 201. By matching the image feature of the charging pile 201 to the real-time captured image, it may be determined whether the charging pile 201 appears in the images captured by the robot in real time. The present disclosure is not limited thereto. If the charging pile 201 is identified in the images captured by the robot 202 in real time, the current position of the robot 202 serves as the transit position 212 and the robot 202 travels along a third path from the transit position 212 to a docking position 214. In some embodiments, if the image of the charging pile may be captured at the initial position 213, the initial position 213 may serve as the transit position 212 so as to carry out subsequent steps. If the charging pile 201 is not identified in the images captured by the robot 202 in real time, the robot 202 acts according to a predetermined mode or an adaptive mode (e.g., acts within a predetermined scope according to the predetermined rotation or displacement) till the charging pile 201 is identified in the images captured by the robot 202 in real time, and then the current position of the robot 202 serves as the transit position 212.

Optionally, if the charging pile 201 still fails to be identified in the images captured by the robot 202 in real time after the robot acts according to a predetermined mode or an adaptive mode, an alert indicating a failure to find the charging pile 201 is generated. The alert is used for indicating that the charging pile 201 is blocked or the charging pile 201 is displaced. In such an embodiment, the robot 202 needs to be retrained, and the position of the charging pile 201 needs to be relabeled based on the existing environment map.

In the embodiment above, considering that the current environment is different from the generated environment map, such that the image of the charging pile 201 may not be captured at the boundary of the transit area 241, a transit position 212 where the image of the charging pile 201 may be captured can be determined within a preset scope based on the action in the predetermined mode or adaptive mode, to settle the above problem. In this embodiment, the robot 202 determines, at the transit position 212, a docking position 214 in the transit area 241, wherein the docking position 214 faces a charging interface of the charging pile 201. In other words, the robot 202 already has, at the docking position 214, a pose for being docked with the charging interface of the charging pile 201. According to some embodiments, the docking position 214 is a position that has been preset on an environment map. According to some embodiments, the robot 202 identifies, at the transit position 212, the position of the charging pile 201 by the images captured in real time, and determines the docking position 214 in the transit area 241 based on the position of the charging pile 201. For example, supposing that on a horizontal plane, a direction of the charging interface of the charging pile 201 is the Y axis and a direction perpendicular to the charging interface is the X axis, then the coordinates of the charging pile 201 are $(x_1, y_1)$. Based on the coordinates $(x_1, y_1)$ of the charging pile 201 and a preset spacing, the coordinates of the docking position 214 are determined to be $(x_2, y_2)$, where $x_2=x_1$, $y_2=y_1+n$, n refers to a preset spacing between the docking position 214 and the charging position 211, the spacing between the docking position 214 (i.e., the robot 202 arrives at the central point of the docking position 214) and the charging pile 201 (i.e., the central point of the charging pile 201) is greater than or equal to twice the maximum diameter of the robot 202 but less than or equal to three times the maximum diameter of the robot 202.

The robot 202 travels along the third path from the transit position 212 to the docking position 214, wherein the third path is calculated on basis of the determined coordinates of the transit position in the environment map based on the images of the charging pile captured by the robot 202 at the transit position. The calculated third path may ensure that the robot poses to be docked with the charging pile for charging at the instant of reaching the docking position from the transit position, wherein the third path is not limited to a straight line. The robot 202 travels from the docking position 214 to the charging position 211 along a first path, wherein the first path is a straight line or an approximately straight line, and during the course of traveling along the first path, the charging pile 201 is identified in the images captured by the robot 202 in real time (i.e., in the first path, fine adjustment only occurs in the direction of X axis, such that the charging pile 201 is identified in the images captured by the robot 202 in real time). During the course of traveling along the first path, the robot 202 maintains a docking pose (for example, the charging socket of the robot 202 faces the charging interface of the charging pile 201); for example, the robot 202 and the charging pile 201 both maintain a docking state (e.g., keeping the cover of the charging interface in an opened state, or a state for docking among the states of a telescopic charging interface). Further, during the course of the robot traveling along the first path from the docking position 214 to the charging position 211, the robot 202 may, for example, adjust the first path based on an auxiliary pattern (e.g., a specific pattern or a two-dimensional code (QR code)) identified in the images captured by the robot 202 in real time, wherein the auxiliary pattern is provided on the charging pile. Further, the robot 202 may, for example, further adjust the first path via an openable auxiliary robot arm disposed on the charging pile 201. However, the present disclosure is not limited thereto. The two above manners may be used in combination, which is not detailed here. Finally, the robot 202 moves to the charging position 211 to dock with the charging pile 201 for charging.

A plurality of exemplary embodiments of the present disclosure will be described with reference to FIGS. 3-7. FIGS. 3-7 show schematic diagrams of auto-recharging of a robot according to exemplary embodiment of the present disclosure. In this embodiment, a sweeping robot 202 is depicted as an example. The sweeping robot 202 performs a cleaning work according to a predetermined working path 229 in an environment map 250 comprising rooms 251, 252, and 253. The position of the charging pile 201 and the transit area 241 are labeled in the environment map 250. Correspondingly, for the purpose of charging, the charging position 211 where the sweeping robot 202 needs to reach may also be labeled on the environment map.

Figure 3:
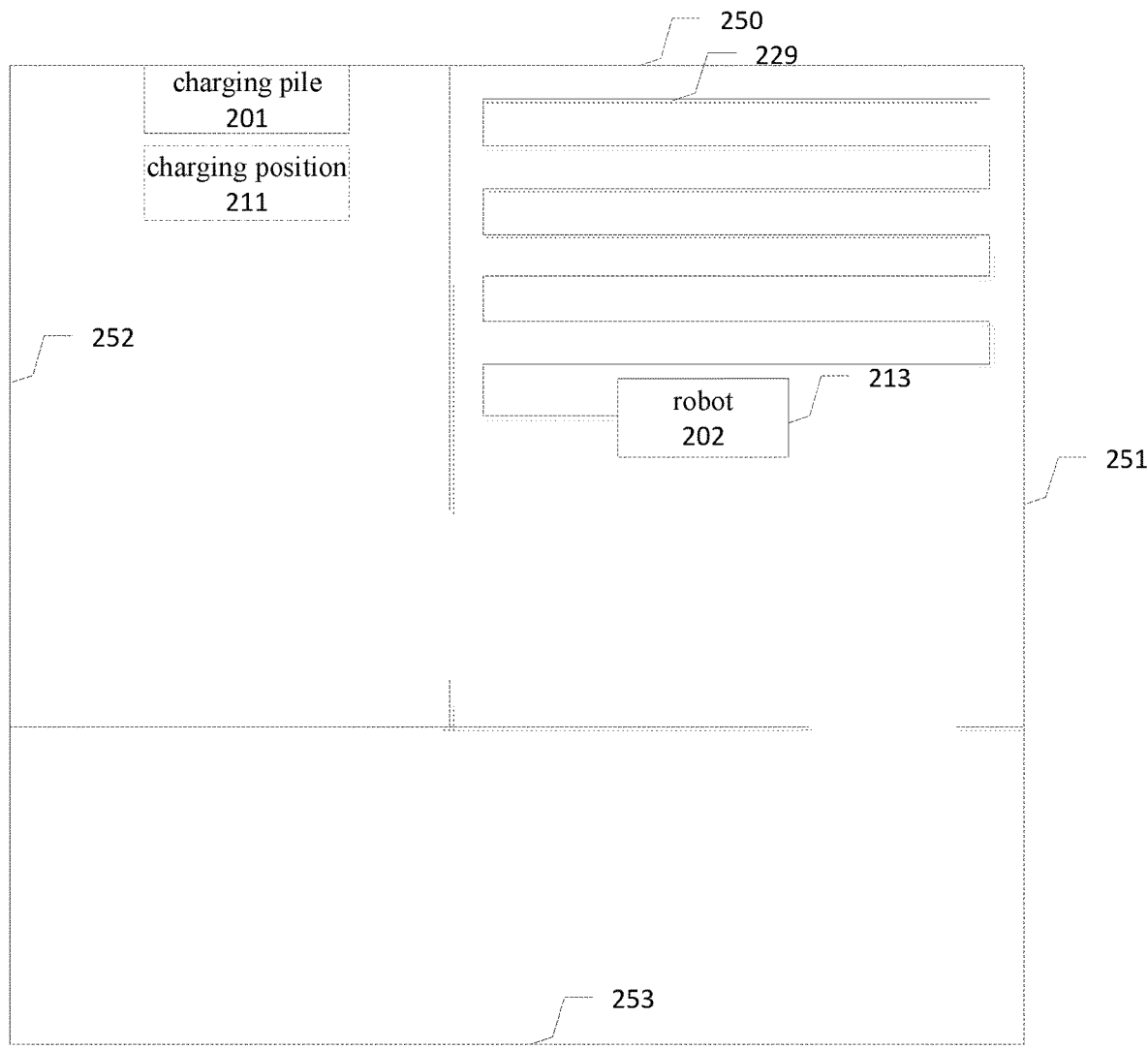
FIGS. 3-7 show schematic diagrams of auto-recharging for a robot according to an exemplary embodiment of the present disclosure.

First, referring to FIG. 3, the sweeping robot 202 moves and cleans along the working path 229 in the room 251 in the environment map 250. When the sweeping robot 202 detects that its battery power is lower than a predetermined threshold to prevent the sweeping robot 202 from continuing working, the sweeping robot 202 would mark the current position of the sweeping robot 202 as the initial position 213. The position of the initial position 213 in the environment map may be determined based on the working path 229 of the sweeping robot 202. The sweeping robot 202 returns to the initial position 213 to continue the unfinished cleaning work along the working path 229 after the sweeping robot 202's charging is complete.

Figure 4:
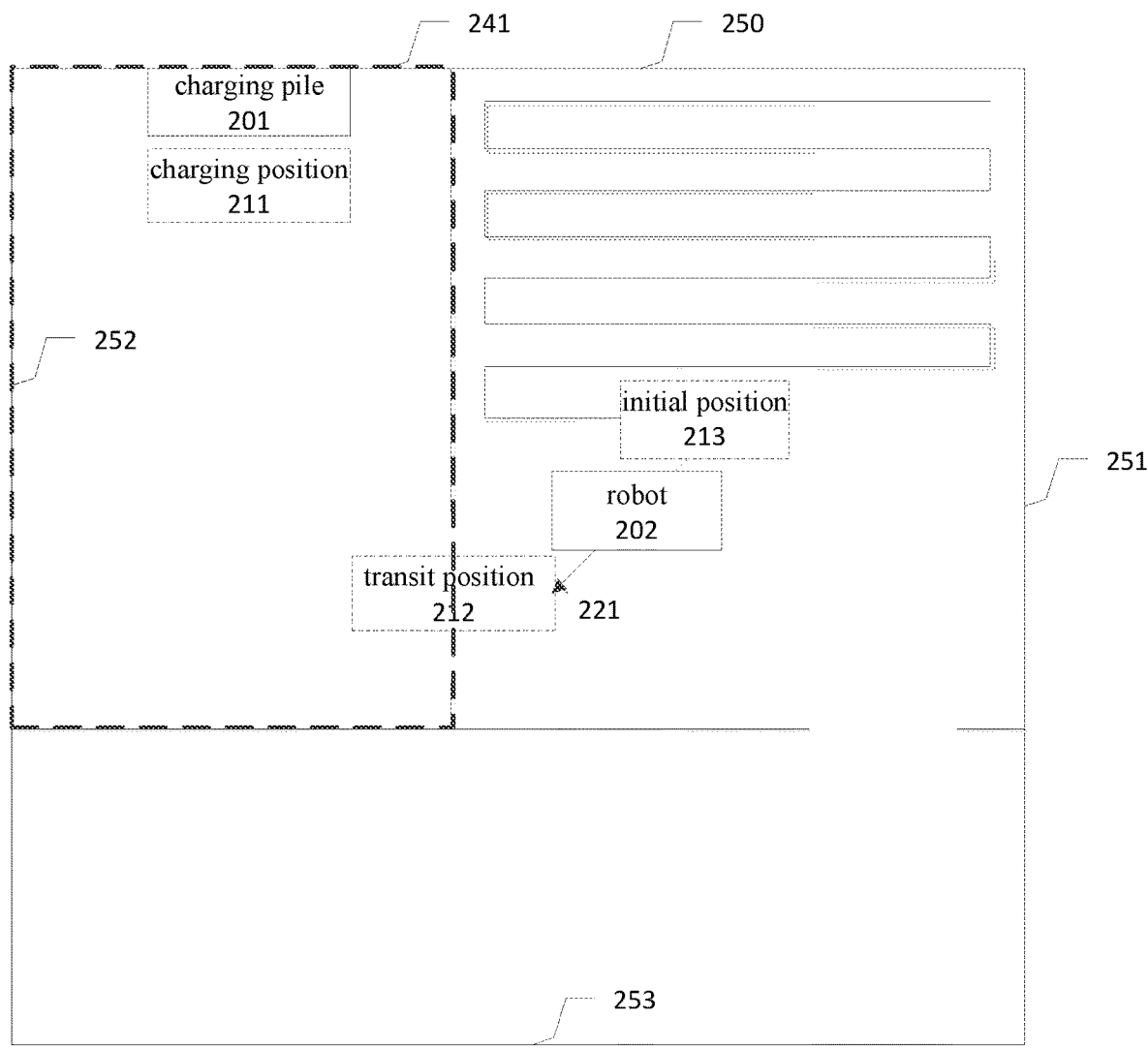

Then, referring to FIG. 4, in this embodiment, the sweeping robot 202 plans a second path 221 based on the initial position 213 and the boundary of the transit area 241, wherein the second path 221 refers to a shortest path for avoiding an obstacle from the initial position 213 to the boundary of the transit area 241; if there is no obstacle, the second path 221 refers to a straight-line path from the initial position 213 to the boundary of the transit area 241. The sweeping robot 202 moves along the second path 221 from the initial position 213 to the boundary of the transit area 241. At the boundary of the transit area 241, if the charging pile 201 is identified in the images captured by the robot 202 in real time, the current position of the robot 202 serves as a transit position 212. If the charging pile 201 is not identified in the images captured by the robot 202 in real time, the robot 202 acts according to a predetermined mode or an adaptive mode (e.g. acts within a predetermined scope according to predetermined rotation or displacement), till the charging pile 201 is identified in the images captured by the robot 202 in real time, and the current position of the robot 202 serves as the transit position 212. If the charging pile 201 is identified in the images captured in real time by the sweeping robot 202 at the initial position 213, then the initial position 213 serves as the transit position 212.

Figure 5:
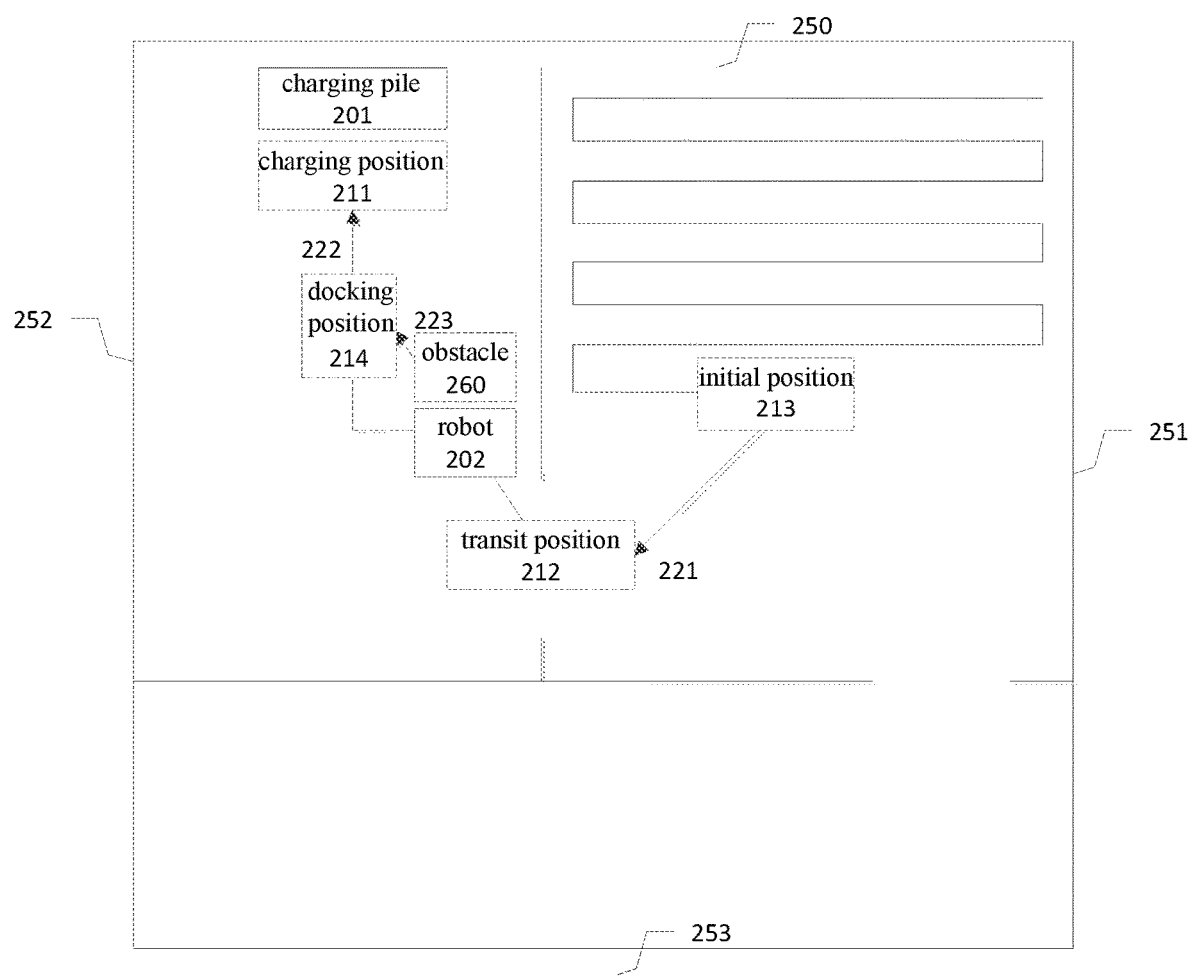
Figure 6:
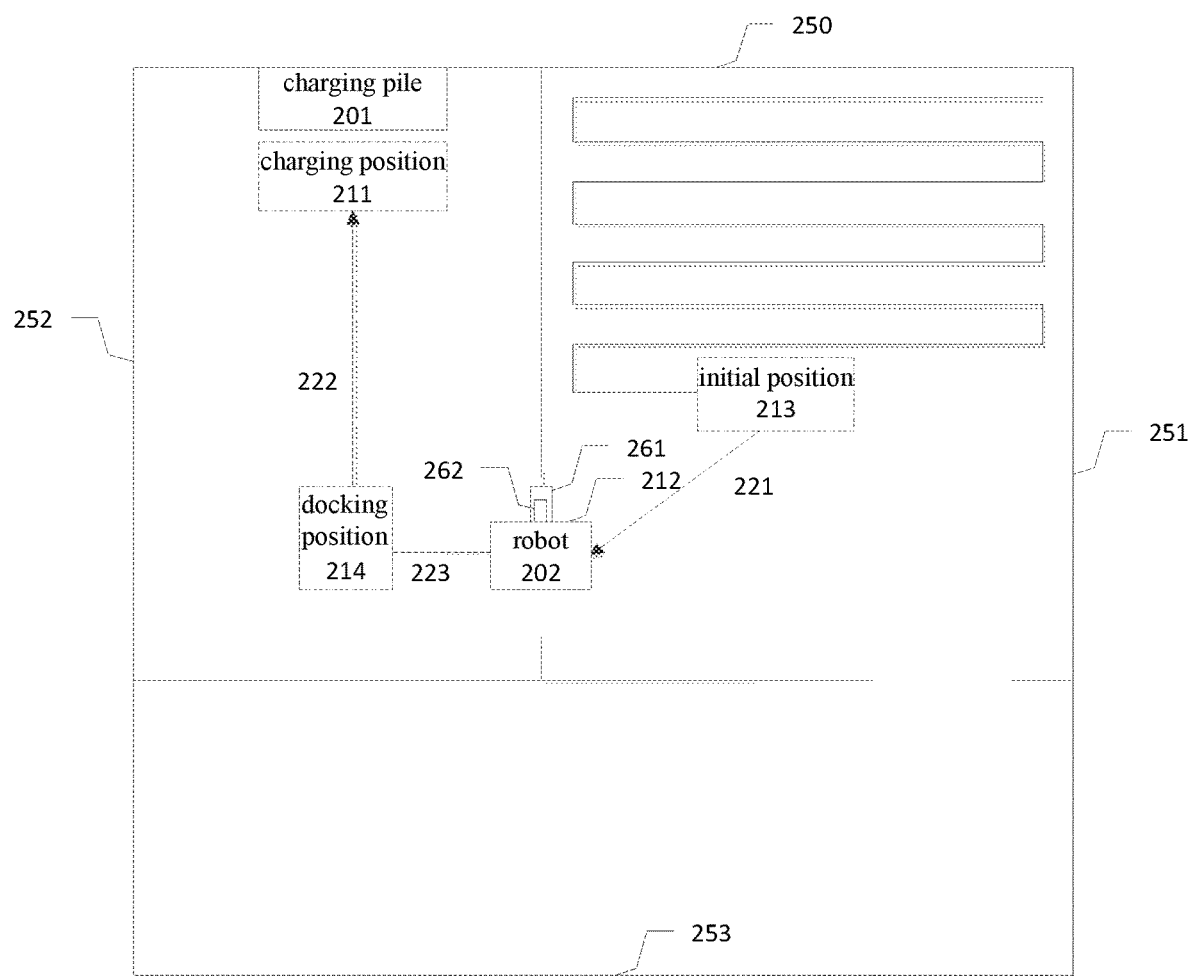
Figure 7:
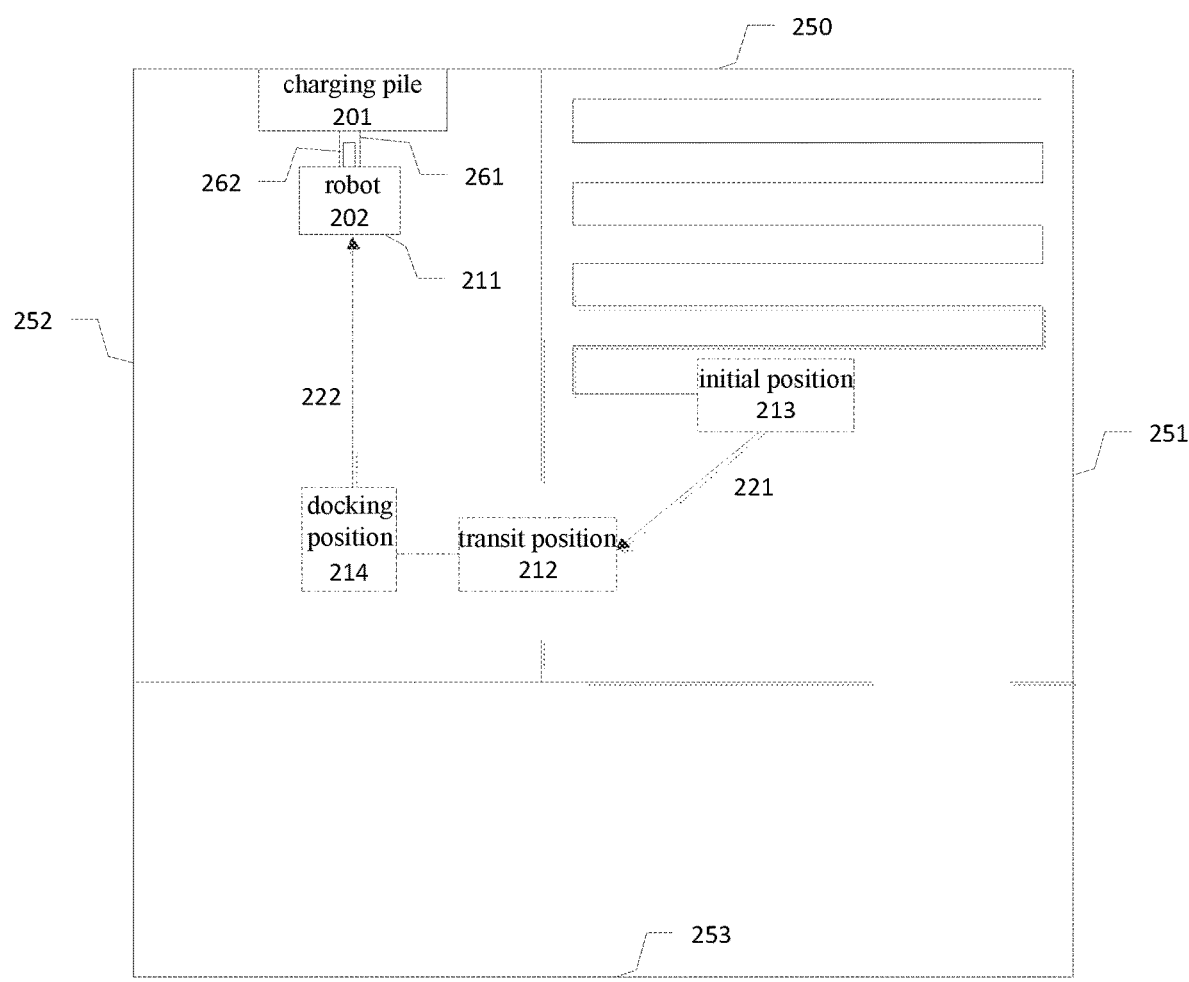

Hereinafter, referring to FIG. 5, in an exemplary embodiment, the sweeping robot 202 travels along a third path 223 from the transit position 212 to the docking position 214 (pre-labeled on the environment map). The sweeping robot 202 may identify, at the transit position 212, the position of the charging pile 201 through the images captured in real time, and determine the docking position 214 in the transit area 241 based on the position of the charging pile 201, or determine the docking position 214 based on the position of the charging pile 201 labeled on the environment map.

In some embodiments, during the course of traveling along the third path 223 from the transit position 212 to the docking position 214, the sweeping robot 202 might encounter an obstacle 260. Therefore, the sweeping robot 202 may determine a horizontal plane based on the images captured in real time during the course of traveling, and determine whether an obstacle 260 exists in the traveling direction based on whether the horizontal plane is blocked or not. If the sweeping robot 202 identifies the obstacle 260 on the third path 223, the sweeping robot 202 may, for example, adjust the third path 223 based on a positional relationship between the charging pile 201 and the obstacle 260 in the real-time captured image. For example, if the charging pile 201 is located at one side to the central line of the images captured by the sweeping robot 202 in real time, the sweeping robot 202 turns to that side so as to avoid the obstacle 260 and meanwhile plans the third path 223, causing the sweeping robot 202 to move towards the docking position 214. In some embodiments, the third path 223 is calculated on basis of the determined coordinates of the transit position 212 on the environment map based on the image of the charging pile captured by the robot 202 at the transit position 212. The calculated third path 223 may ensure that the robot 202 poses to be docked with the charging pile 201 for charging at the instant of reaching the docking position 214 from the transit position 212. The third path 223 may be the shortest path for avoiding the obstacle from the transit position 212 to the docking position 214; if there is no obstacle, the third path 223 is a straight-line path from the transit position 212 to the docking position 214. The third path 223 is not limited to a straight-line path.

Then, the sweeping robot 202 travels to the charging position 211 along the first path 222 from the docking position 214 to the charging position 211 and carries out subsequent docking and charging. During the course of traveling along the first path 222, both the robot 202 and the charging pile 201 maintain a docking state. Hereinafter, referring to FIGS. 6 and 7, in another exemplary embodiment, the charging interface 261 of the sweeping robot 202 for plugging with the charging pile 201 and a sensor 262 of the sweeping robot 202 are located at the same side of the sweeping robot. To cause the charging interface 261 of the sweeping robot 202 to be exactly docked with the charging pile 201 when the sweeping robot 202 arrives at the charging position 211, for example a straight-line path may be planned during the real-time planning of the first path 222 so as to eliminate a step of rotating the sweeping robot 202 in situ, after arriving at the charging position 211, to cause its charging interface 261 to be docked with the charging pile 201. For example, the sweeping robot 202 may first move to the docking position 214 for the charging interface of the charging pile 201 to cause the charging interface 261 of the sweeping robot 202 at the docking position 214 already face the charging interface of the charging pile 201, such that the sweeping robot 202 is only needed to adjust the path in real time to cause the charging interface of the charging pile 201 in the first path 222 to be located at the image center of the images captured in real time by the sweeping robot 202. In a variation of this embodiment, the above technical solution is adjusted based on the positions of the sensor 262 and the charging interface 261 provided on the sweeping robot 202. For example, the sensor 262 and the charging interface 261 are arranged in an angle at different sides of the sweeping robot 202; based on the angle between the sensor 262 and the charging interface 261, the orientation of the charging interface 261 may be determined in the image captured by the sensor 262, and then the first path 222 of the sweeping robot 202 is finely adjusted based on whether the charging interface of the charging pile 201 is aligned with the charging interface 261. The present disclosure is not limited thereto.

In various embodiments above, the sensor 262 of the sweeping robot 202 for example may be a camera with a fixed viewing angle. In some other embodiments, the sensor 262 of the sweeping robot 202 for example may be a panorama camera which may rotate 360°. The present disclosure may implement more variations, which will not be detailed here.

What has been described mentioned above only schematically depicts a plurality of embodiments of the present disclosure; the present disclosure is not limited thereto.

According to one or more embodiments described above, segmented path planning is performed on the path returning to the pile, and different obstacle avoidance methods are adopted in different path segments with different possibilities of obstacles, thereby better solving the problem of failing to return to the pile for charging due to the obstacles in the path of the robot and the charging pile, so as to achieve intelligent obstacle avoidance, thereby reducing the number of collisions of the robot, increasing the service life of the robot, and improving the user experience and purchasing desire.

The present disclosure further provides a robot. Hereinafter, referring to FIG. 8, which shows a modular diagram of a robot according to an embodiment of the present disclosure. The robot 300 comprises a sensor 310, a motor 320, and a processor 330.

The sensor 310 is at least configured to capture images surrounding the robot in real time.

The motor 320 is configured to drive the robot to move.

The processor 330 is configured to cause the robot to move from an initial position to a docking position, wherein the docking position faces a charging interface of the charging pile; the processor 330 is further configured to adjust the robot to travel along a first path from the docking position to a charging position so as to be docked with the charging pile at the charging position, wherein the first path is a straight-line or approximately straight-line path, the robot maintains a docking pose during the course of traveling along the first path, and the charging pile is identified in the images captured by the robot in real time.

In some embodiments of the present disclosure, the robot may be a sweeping robot or a mopping robot.

Figure 8:
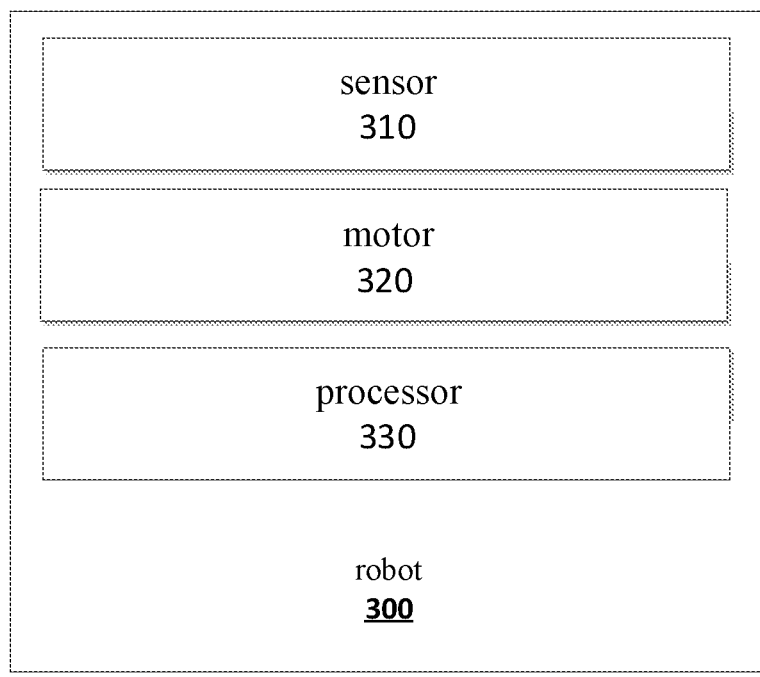
FIG. 8 shows a modular diagram of a robot according to an embodiment of the present disclosure.

FIG. 8 only schematically shows a modular diagram of the robot according to the present disclosure. Without departing from the idea of the present disclosure, splitting, merging, and adding of the modules all fall within the protection scope of the present disclosure.

The present disclosure provides an auto-recharging system for a robot. Please refer to FIG. 2. The auto-recharging system for a robot comprises the robot 300 (reference number 202 in FIG. 2) and the charging pile 201 shown in FIG. 8. In the auto-recharging system for a robot, the robot moves from an initial position to a docking position, wherein the docking position faces a charging interface of the charging pile; the robot travels from the docking position to a charging position along a first path such that the robot is docked to the charging pile at the charging position, wherein the first path is a straight-line or approximately straight-line path; the robot maintains a docking pose during the course of traveling along the first path, and the charging pile is identified in the images captured by the robot in real time.

In the exemplary embodiment of the present disclosure, there is further provided a computer readable storage medium on which a computer program is stored, wherein the program, for example when being executed by the processor, may implement the steps of the auto-recharging method for a robot in any embodiment above. In some possible embodiments, various aspects of the present disclosure may be further implemented in the form of a program product, comprising program codes; when the program product is executed on a terminal equipment, the program codes are configured to cause the terminal equipment to execute the steps according to various exemplary embodiments of the present disclosure described in the auto-recharging method for a robot in the description.

Figure 9:
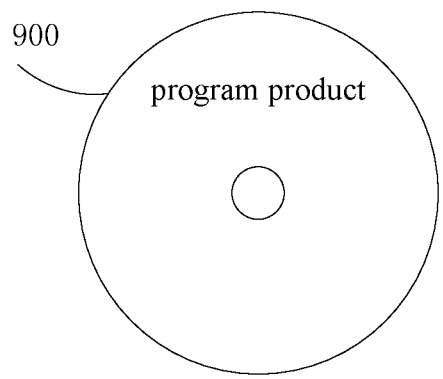
FIG. 9 schematically shows a schematic diagram of a computer readable storage medium in an exemplary embodiment of the present disclosure.

Referring to FIG. 9, a program product 900 for implementing the method above according to the embodiments of the present disclosure is described. The program product 900 may adopt a portable compact disk read-only memory (CD-ROM) and comprise program codes, and may be run on a terminal equipment, for example, a personal computer. However, the program product of the present disclosure is not limited thereto. In the present disclosure, the readable storage medium may be any tangible medium containing or storing the program that may be used by an instruction executing system, device, or member or combination thereof.

The program product may adopt any combination of one or more readable mediums. The readable medium may be a readable signal medium or a readable storage medium. The readable storage medium, for example, may be, but is not limited to, an electrical, magnetic, optical, electromagnetic, infrared, or semiconductor system, device, or member, or any combination thereof. More specific examples (a non-exhaustive list) of the readable storage medium may include an electrical connection having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical memory member, a magnetic memory member, or any appropriate combination thereof.

The computer-readable storage medium may include a data signal propagated in a baseband or as part of a carrier wave, in which readable program codes are carried. A data signal propagated in such a way may adopt a plurality of forms, including, but not limited to, an electromagnetic signal, an optical signal, or any appropriate combination thereof. The readable storage medium may also be any readable medium other than the readable storage medium, which readable medium may send, propagate or transmit the programs used by the instruction executing system, device, member, or combination thereof. The program codes included in the readable medium may be transmitted using any appropriate medium, including, but not limited to: wireless, wired, cable, RF, etc., or any appropriate combination thereof.

Program codes for carrying out operations of the present disclosure may be compiled in any combination of one or more programming languages including object-oriented programming languages such as Java, C++ or the like, as well as conventional procedural programming languages, such as the "C" language or similar programming languages. The program codes may be executed entirely on a tenant's computing equipment, partially on the tenant's equipment, executed as a stand-alone software package, partially on the tenant's computing equipment and partially executed on a remote computing equipment, or entirely executed on the remote computing equipment or server. In a scenario involving a remote computing equipment, the remote computing equipment may be connected to the tenant's computing equipment through any type of network, including a local area network (LAN) or a wide area network (WAN), or connected to an external computing equipment (for example, connected through the Internet using an Internet Service Provider).

In an exemplary embodiment of the present disclosure, there is further provided an electronic equipment, which may comprise a processor (which may, for example, be used to implement the aforementioned processor 330) and a memory for storing an executable instruction of the processor. Wherein, the processor is configured to execute the steps of the auto-recharging method for a robot in any one of above embodiments by executing the executable instruction.

Those skilled in the art may understand that various aspects of the present disclosure may be implemented as a system, a method or a program product. Therefore, various aspects of the present disclosure may be specifically implemented in the following forms: complete hardware, complete software (including firmware and microcode, etc.), or a combination of hardware and software, which may be generally referred to as "a circuit," "a module," or "a system."

Hereinafter, referring to FIG. 10, an electronic equipment 1000 according to such an embodiment of the present disclosure will be described. The electronic equipment 1000 shown in FIG. 10 is only an example, which should not constitute any limitation to the function and use scope of the embodiments of the present disclosure.

Figure 10:
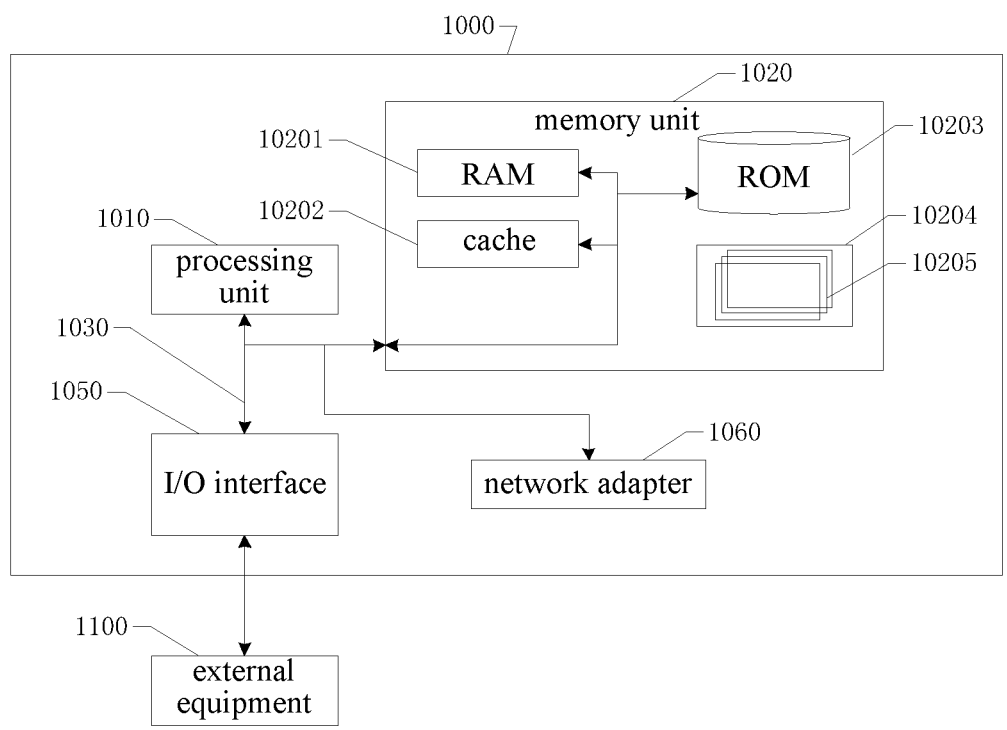
FIG. 10 schematically shows a schematic diagram of an electronic equipment.

As shown in FIG. 10, the electronic equipment 1000 is represented in the form of a general computing equipment. Components of the electronic equipment 1000 may comprise, but is not limited to: at least one processing unit 1010 (for example, for implementing the above-mentioned processor 330), at least one memory unit 1020, and a bus 1030 connecting different system components (including a memory unit 1020 and a processing unit 1010) etc.

Wherein, the memory unit stores program codes which may be executed by the processing unit 1010, causing the processing unit 1010 to execute the steps according to various exemplary embodiments of the present disclosure described in the auto-recharging method for a robot in the description. For example, the processing unit 1010 may execute the steps as shown in FIG. 1.

The memory unit 1020 may comprise a readable medium in the form of a volatile memory unit, e.g. a random-access memory unit (RAM) 10201 and/or a cache memory unit 10202, and may further comprise a read-only memory unit (ROM) 10203.

The memory unit 1020 may further comprise a program/practical tool 10204 having a set (at least one) of program modules 10205. Such a program module 10205 includes, but is not limited to: an operating system, one or more application programs, other program modules and program data, wherein each or a certain combination in these examples may include implementation of a network environment.

The bus 1030 may represent one or more of several bus structures, including a memory unit bus or a memory unit controller, a peripheral bus, a graphical acceleration port, a processing unit, or a local area bus using any bus structure(s) in a plurality of bus structures.

The electronic equipment 1000 may also communicate with one or more external equipments 1100 (e.g., a keyboard, a pointing device, a Bluetooth device, etc.), or communicate with one or more equipment s enabling the tenant to interact with the electronic equipment 1000, and/or communicate with any equipment (e.g., a router, a modem, etc.) enabling the electronic equipment 1000 to communicate with one or more other computing equipment. Such communication may be carried out via an input/output (I/O) interface 1050. Moreover, the electronic equipment 1000 may further communicate with one or more networks (e.g., a local area network (LAN), a wide area network (WAN), and/or a public network, e.g., the Internet) via a network adapter 1060. The network adapter 1060 may communicate with other modules of the electronic equipment 1000 via the bus 1030. It should be understood that although not shown in the figure, other hardware and/or software modules may be used in conjunction with the electronic equipment 1000, including, but not limited to, microcode, an equipment driver, a redundancy processing unit, an external disk driving array, a RAID system, a tape driver, and a data backup memory system, etc.

Through the descriptions of the embodiments above, those skilled in the art should easily understand that the exemplary embodiments described here may be implemented via software or via a combination of software and necessary hardware. Therefore, the technical solution according to the embodiments of the present disclosure may be embodied in the form of a software product. The software product may be stored in a non-volatile storage medium (which may be a CD-ROM, a U disc, or a mobile hard disk, etc.) or in a network, including a plurality of instructions to cause a computing equipment (which may be a personal computer, a server, or a network equipment etc.) to execute the auto-recharging method for a robot according to the embodiments of the present disclosure.

After considering the specification and practicing the disclosures, those skilled in the art will easily envisage other embodiments of the present disclosure. The present application intends to cover any transformation, use or adaptive variation of the present disclosure, and such transformations, uses or adaptive variations follow a general principle of the present disclosure and include the common knowledge or customary technical means in the technical field as undisclosed in the present disclosure. The specification and the embodiments are only regarded as exemplary, and the actual scope and spirit of the present disclosure is pointed out by the appended claims.

We claim:

1. A computer-implemented method, comprising:
    moving a robot from an initial position to a docking position in an environment map that is generated by the robot, wherein the robot captures images of surroundings of the robot when generating the environment map, wherein the robot at the docking position faces a charging interface of a charging pile, and the docking position is determined based on a position of the charging pile identified by means of images captured by the robot in real time; and
    moving the robot from the docking position to a charging position along a first path such that the robot is docked to the charging pile at the charging position, wherein the first path is a straight-line or approximately straight-line path, and wherein, during the course of traveling along the first path, the robot maintains a docking pose and the charging pile is identifiable in the images captured by the robot in real time, and
    wherein the operation of moving the robot from the initial position to the docking position further comprises,
    moving the robot from the initial position to a boundary of a transit area along a second path, wherein the second path is planned by the robot at the initial position, wherein the transit area is preset in the environment map when the environment map is generated, and the transit area is defined as an area in which each image captured by the robot when generating the environment map has the charging pile; and
    moving the robot from the boundary of the transit area to the docking position along a third path, wherein the third path is adjusted in real time based on the images captured by the robot in real time.

2. The computer-implemented method according to claim 1, wherein the operation of moving the robot from the boundary of the transit area to the docking position along the third path further comprises:
   determining whether the charging pile is identified in the images captured by the robot in real time when the robot moves to the boundary of the transit area;
   when positive, taking the current position of the robot as a transit position, and moving the robot from the transit position to the docking position along the third path;
   when negative, moving the robot according to a predetermined mode or an adaptive mode until the charging pile is identified in the images captured by the robot in real time, and taking the position of the robot at which the charging pile is identified in the images captured by the robot as the transit position.

3. The computer-implemented method according to claim 2, wherein when the charging pile still fails to be identified in the images captured by the robot in real time after moving the robot according to the predetermined mode or the adaptive mode, an alert indicating a failure to find the charging pile is generated.

4. The computer-implemented method according to claim 2, wherein the docking position is located in the transit area, and the docking position is determined at the transit position on the basis of the position of the charging pile identified by means of images captured by the robot in real time at the transit position.

5. The computer-implemented method according to claim 1, wherein the operation of moving the robot from the docking position to the charging position along the first path comprises:
   adjusting, by the robot, the first path based on an auxiliary pattern identified in images captured by the robot in real time, wherein the auxiliary pattern is provided on the charging pile.

6. The computer-implemented method according to claim 1, wherein the initial position of the robot is determined based on a motion trajectory of the robot in the environment map before recharging, and/or a position, in the environment map, of an identification feature in the images captured by the robot in real time, wherein the identification feature comprises a feature of the charging pile, or a feature of an object or a label in the environment map, wherein the object or the label has a fixed positional relationship with respect to the charging pile.

7. A robot, characterized in that the robot comprises:
   a sensor at least configured to capture images of surroundings of the robot in real time;
   a motor configured to drive the robot;
   a processor configured to:
      cause the robot to move from an initial position to a docking position in an environment map that is generated by the robot, wherein the robot captures images of surroundings of the robot when generating the environment map, wherein the robot at the docking position faces a charging interface of a charging pile, and the docking position is determined based on a position of the charging pile identified by means of images captured by the robot in real time; and
      cause the robot to travel along a first path from the docking position to a charging position so as to be docked with the charging pile at the charging position, wherein the first path is a straight-line or approximately straight-line path, and wherein, during the course of traveling along the first path, the robot maintains a docking pose and the charging pile is identifiable in the images captured by the robot in real time, and
   wherein the processor is configured to:
   cause the robot to move from the initial position to a boundary of a transit area along a second path, wherein the second path is planned by the robot at the initial position, wherein the transit area is preset in the environment map when the environment map is generated, and the transit area is defined as an area in which each image captured by the robot when generating the environment map has the charging pile, and
   cause the robot to move from the boundary of the transit area to the docking position along a third path, wherein the third path is adjusted in real time based on the images captured by the robot in real time.

8. The robot according to claim 7, wherein the processor is configured to:
   determine whether the charging pile is identified in the images captured by the robot in real time when the robot moves to the boundary of the transit area;
   when positive, take the current position of the robot as a transit position, and cause the robot to move from the transit position to the docking position along the third path;
   when negative, cause the robot to move according to a predetermined mode or an adaptive mode until the charging pile is identified in the images captured by the robot in real time, and take the position of the robot at which the charging pile is identified in the images captured by the robot as the transit position.

9. The robot according to claim 8, wherein the processor is configured to generate an alert indicating a failure to find the charging pile, when the charging pile still fails to be identified in the images captured by the robot in real time after moving the robot according to the predetermined mode or the adaptive mode.

10. The robot according to claim 8, wherein the docking position is located in the transit area, and the docking position is determined at the transit position on the basis of the position of the charging pile identified by means of images captured by the robot in real time at the transit position.

11. The robot according to claim 7, wherein the processor is configured to:
   adjust the first path based on an auxiliary pattern identified in images captured by the robot in real time, wherein the auxiliary pattern is provided on the charging pile.

12. A non-transitory storage medium comprising a computer program which, when executed by a processor, causes the processor to perform the operations as follows:
   moving a robot from an initial position to a docking position in an environment map that is generated by the robot, wherein the robot captures images of surroundings of the robot when generating the environment map, wherein the robot at the docking position faces a charging interface of a charging pile, and the docking position is determined based on a position of the charging pile identified by means of images captured by the robot in real time; and
   moving the robot from the docking position to a charging position along a first path so as to be docked with the charging pile at the charging position, wherein the first path is a straight-line or approximately straight-line path, and wherein, during the course of traveling along the first path, the robot maintains a docking pose and the charging pile is identifiable in the images captured by the robot in real time, and wherein the operation of moving the robot from the initial position to the docking position further comprises:

moving the robot from the initial position to a boundary of a transit area along a second path, wherein the second path is planned by the robot at the initial position, wherein the transit area is preset in the environment map when the environment map is generated, and the transit area is defined as an area in which each image captured by the robot when generating the environment map has the charging pile; and moving the robot from the boundary of the transit area to the docking position along a third path, wherein the third path is adjusted in real time based on the images captured by the robot in real time.

13. The robot according to claim 7, wherein the initial position of the robot is determined based on a motion trajectory of the robot in the environment map before recharging, and/or a position, in the environment map, of an identification feature in the images captured by the robot in real time, wherein the identification feature comprises a feature of the charging pile, or a feature of an object or a label in the environment map, wherein the object or the label has a fixed positional relationship with respect to the charging pile.

* * * * *